INVENTORS
PAUL R. ADAMS
SIDNEY B. PICKLES
BY
*Percy P. Lantz*
ATTORNEY

United States Patent Office 2,753,554
Patented July 3, 1956

2,753,554

OMNIRANGE BEACON SYSTEM

Paul R. Adams, Montclair, N. J., and Sidney B. Pickles, Tarrytown, N. Y., assignors to International Telephone and Telegraph Corporation, a corporation of Maryland Application April 3, 1952, Serial No. 280,404

7 Claims. (Cl. 343—106)

This invention relates to omnirange beacon systems and more particularly to omnidirectional radio range systems for coarse and fine indications.

Omnidirectional radio beacon systems provide means for an aircraft to determine its bearing to the beacon from any direction and so are more flexible than fixed course beacons. One type of omnidirectional beacon generally favored is the so-called phase comparison type. In these systems heretofore employed, a directive radio pattern is rotated at a given rate so that at a remote receiving point an amplitude variation is produced having a fundamental frequency component determined by the rate of rotation. The wave produced by this rotation may be referred to as the bearing envelope wave or bearing information wave. A reference signal wave is also transmitted as a modulation component of a frequency corresponding in frequency with the envelope wave. This reference signal wave, however, has a "fixed in phase" characteristic. The envelope wave has a phase relation with respect to the reference wave dependent upon the angular position of the remote receiving point with respect to the point of origin of the beacon radiation. The waves are so related that in a predetermined azimuth, for example north, the envelope wave and reference wave are co-phasal. Thus the bearing of a craft with respect to the beacon can readily be obtained by making a phase comparison of these two waves.

In systems using the longer wavelengths, electronic rotation of the bearing pattern is generally used because the structure is too large to rotate at a speed to provide a practical envelope frequency. At higher frequencies physical rotation is feasible. This is desirable as it avoids quadrantal and octantal errors which occurr in electronic rotation systems.

In comparing a sine wave rotation frequency with a corresponding reference wave, the difference in phase varies by only one degree for one degree variation in azimuth giving low sensitity and thus rendering the system subject to deviation errors from reflected energy in these portions. To remedy this, the antenna pattern is given harmonic frequency distortions. In the interests of radiation pattern efficiiency, the principal antennas have heretofore been generally spaced to provide a minimum or complete absence of harmonic frequencies in the envelope wave, any desired harmonic distortion being provided by added circuits. Thus the pattern used has generally been of cardioid form having single minimum which was obtained by a plurality of fixed antennas. Accordingly in the past there has been considerable mutual coupling between the fixed antennas with the consequent development of undesired vertical polarized energy from normal horizontally polarized antennas. This fact tends to reduce sharpness of the courses defined by the beam.

One of the objects of this invention, therefore, is to provide an omnidirectional radio beacon and receiver system which overcomes the aforementioned objections; and further to provide such a system capable of making coarse and fine azimuth indications.

A further object of this invention is to provide an omnidirectional radio range wherein the coarse and fine azimuth signals are made separately in the receiver.

According to a feature of our invention, an antenna system is provided for radiating and rotating a multilobe pattern wherein the lobes have a predetermined radial spacing and one of the lobes is of greater field strength than the others so that a receiver at a remote point detects the radiation producing an envelope wave having a fundamental component in accordance with the one lobe and a harmonic frequency in accordance with the total number of lobes. The antenna system may be arranged to provide for any desired harmonics or number of radiation lobes. Instead of making the fundamental lobe of greater field strength than the others, the reverse may be employed. The carrier frequency radiated is modulated with reference signals in synchronism with the rotation of each of the lobes through a given radial direction. At the receiver means are provided for separating the carrier enevelope wave into the fundamental and harmonic frequency components and for detecting the reference signals. A first phase comparator is provided for comparing the phase of the fundamental frequency with the timing of the reference signals for coarse indication, and a second wave comparator is provided for comparing the phase of the harmonic frequency with the timing of the reference signals for fine indication. The two comparators are coupled on the basis of the ratio of the fundamental and harmonic frequencies, whereby any ambiguity in the comparison of the second or fine phase comparator is resolved by the first comparator.

The above-mentioned and other features and objects of this invention will become more apparent and the invention itself best understood by reference to the following description taken in conjunction with the accompanying drawings, in which.

Figure 1:
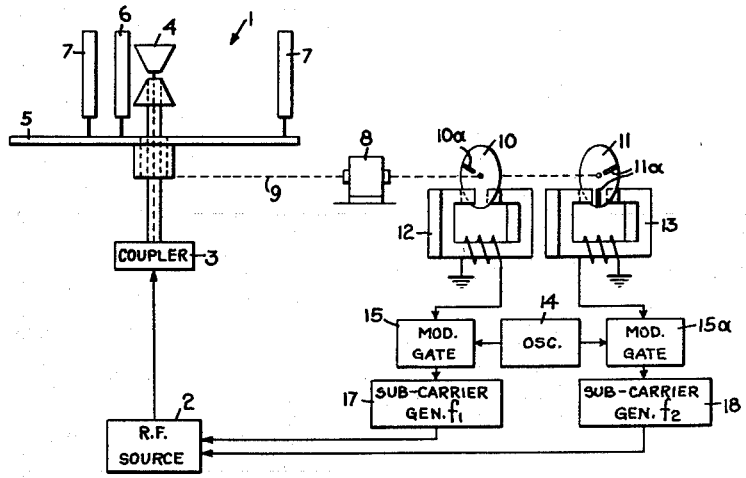
Fig. 1 is a diagram in block form illustrating a circuit arrangement of an omnirange beacon transmitter that may be employed in accordance with the principles of this invention.
Figure 1A:
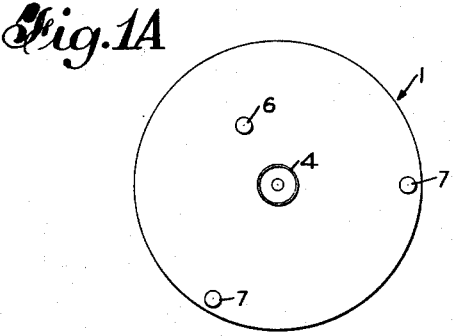
Fig. 1A is a top plan illustration of the antenna system of Fig. 1.
Figure 1B:
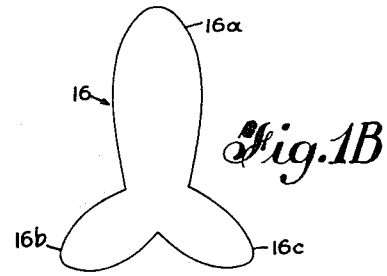
Fig. 1B is a graphic illustration of the radiation pattern of the antenna system of Fig. 1.

Referring to Figs. 1 and 1A of the drawing, the omnirange beacon transmitter therein shown comprises an antenna system 1 to which is supplied a typical carrier frequency, for example 1000 mc., from R-F source 2 through antenna coupler 3. The antenna system 1 includes a fixed omnidirectional antenna 4 which for purposes of this explanation is shown as a single unit, it being understood that a vertical stacked antenna array may be used to increase the vertical concentration of energy if desired. On a disc 5 mounted around antenna 4 are a plurality of reflectors as indicated at 6 and 7, Fig. 1A. The disc 5 is rotated at a desired speed, for example 30 revolutions per second by a motor 8 and mechanical linkage 9. Thus, while antenna 4 is supplied with energy, the rotating reflectors 6 and 7 distort the radiated pattern to produce a plurality of radiation lobes 16. Thus at a remote point the received radiations will vary with a fundamental frequency dependent upon the rotation of the major lobe 16a and with a harmonic frequency dependent upon the rotation of all the lobes 16a, 16b and 16c. A greater number of reflectors or other reflector and feeder arrangements may be utilized if the radiation of a greater number of lobes is desired. The harmonic order received at a remote point is dependent upon the number of lobes in the radiation pattern.

The motor 8 also drives two discs 10 and 11 composed of a non-magnetic material in synchronism with the disc 5 to provide pulses for furnishing fundamental and harmonic reference signals. With each disc 10 and 11 are provided magnetic pickup units 12 and 13, respectively, which serve to provide pulses each time iron slugs 10a and 11a carried by the rotating discs 10 and 11 pass the pickup units 12 and 13, respectively. The iron slugs are so located in the peripheral portion of discs 10 and 11 that they pass the pickup units 12 and 13 each time the corresponding radiation lobe passes through a predetermined direction. Output energy from the magnetic pickup device 12 synchronizes operation of a modulator gate 15 for bursts of oscillations from oscillator 14 to frequency modulate the sub-carrier frequency $f_1$ of sub-carrier generator 17. The modulated sub-carrier is applied to modulate the R-F carrier source 2. Pickup unit 13 likewise serves to synchronize operation of a modulator gate 15a for bursts of oscillations from oscillator 14 to frequency modulate the sub-carrier $f_2$ of sub-carrier generator 18. This modulated sub-carrier is also applied to modulate the R-F carrier source 2. Thus each time a radiation lobe is passed through a predetermined direction, reference frequency energy is impressed on the transmission carrier frequency and transmitted to all receivers regardless of location. The radiation from antenna system 1 at any given receiving point comprises an R-F carrier amplitude modulated at a fundamental and harmonic rate and sub-carrier frequencies modulated with the fundamental and harmonic reference signals.

Figure 2:
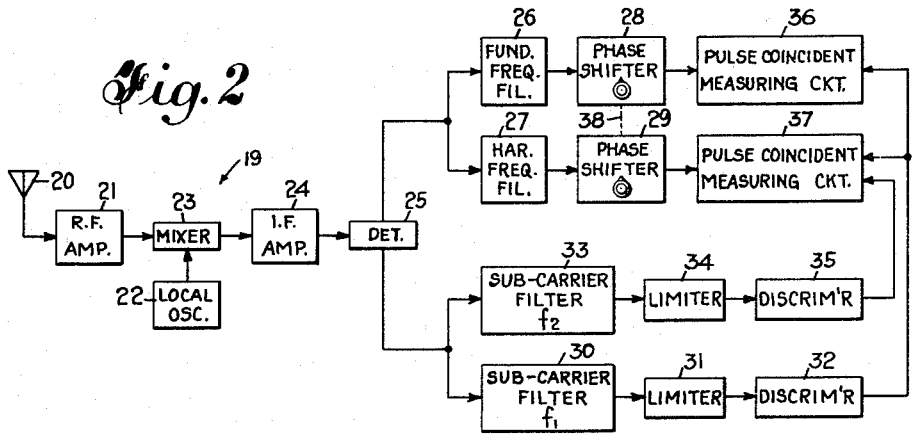
Fig. 2 is a schematic block diagram of a receiver for use with the transmitter of Fig. 1.

The receiver 19 shown in Fig. 2, provided in an aircraft, preferably includes a non-directive receiving antenna 20 and the usual frequency converter circuit comprising an R-F amplifier 21, a local oscillator 22, and a mixer 23 which feeds into an intermediate frequency amplifier 24. The output of the I-F amplifier is coupled to a detector 25 which separates the carrier and sub-carrier frequencies.

The output of I-F amplifier 24 is fed through detector 25 to audio frequency filters 26 and 27. The input signal to filters 26 and 27 includes the bearing envelope wave having a fundamental and harmonic frequency component derived from the amplitude modulation of the radiated R-F signal by the rotation of reflectors 6 and 7. The fundamental frequency, due to lobe 16a, is passed by the fundamental frequency filter 26 and coupled to the phase shifter 28. The harmonic frequency component of the bearing envelope wave is passed by the harmonic filter 27 and coupled to phase shifter 29. The filtered components of the bearing envelope wave have phases dependent upon the angular position of the receiver from the transmitter.

In order to obtain the reference signals to compare with the fundamental and harmonic components of the bearing envelope wave, the output of the I-F amplifier 24 is fed through detector 25 to filters 30 and 33. Filter 30 passes only the fundamental reference signals of sub-carrier $f_1$. The signal output from filter 30 is fed to limiter circuit 31 which clips the signal and eliminates any amplitude variations so that the output of limiter 31 consists of the clipped fundamental sub-carrier frequency modulated at the fundamental pulse frequency. Discriminator circuit 32 demodulates the output of the limiter circuit 31. The output of the discriminator 32 comprises pulses having a repetition rate equal to the fundamental rotation frequency of lobe 16a as per disc 10. Filter 33 eliminates from the output of the detector 25 all but the R-F signal at sub-carrier frequency $f_2$. The sub-carrier signal is fed to limiter circuit 34 and then to discriminator 35. The output of discriminator 35 comprises pulses having a repetition occurrence corresponding to the harmonic rotation frequency component of lobes 16b and 16c per disc 11.

The fundamental frequency component of the bearing envelope wave is coupled through phase shifter 28 to a pulse coincidence measuring circuit 36 where it is compared to the fundamental frequency reference pulses from the output of discriminator 32. The adjustment of phase shifter 28 necessary to bring the fundamental bearing signal and reference pulses to a coincident relation indicates the azimuth of the transmitter from the receiver, provided that dial of the phase shifter is properly calibrated. The harmonic frequency component of the bearing envelope wave is coupled through phase shifter 29 to pulse coincidence measuring circuit 37 where it is compared to the harmonic frequency reference pulses from the combined outputs of discriminators 32 and 35. For any one position of the receiver in relation to the transmitter, there will be as many points of coincidence between the harmonic reference pulse and harmonic component of the bearing signal as the order of harmonic being transmitted, i. e. for the third harmonic there will be three positions of phase shifter 29 where the harmonic pulse and harmonic bearing signal are coincident. The bearing indication derived from the fundamental signal is necessary to resolve this harmonic ambiguity. The bearing indication derived from the harmonic signals has greater sensitivity and is thus more accurate than the fundamental frequency bearing indication. Phase shifters 28 may be coupled to phase shifter 29 by mechanical linkage and gears 38 in such a manner that phase shifter 29 will be rotated three complete revolutions for each revolution of phase shifter 28, when the third harmonic is used. Thus the harmonic ambiguity is automatically resolved, and the reading in phase shifters 28 and 29 that indicate coincidence of the bearing and reference signals will be the true azimuth of the receiver to the transmitter.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a direction finding system, a beacon comprising radiator means for radiating a multilobe pattern wherein the lobes have a predetermined radial spacing, means to rotate said radiation pattern at a given rate, one of said lobes having a different radiation strength than the others whereby detection at a remote point produces a fundamental frequency in response to said one lobe and a harmonic frequency in response to all said lobes, means for applying energy of an R-F carrier frequency to said radiator and means to modulate said carrier frequency with reference signals in synchronism with the rotation of each of said lobes through a given radial direction, a receiver at a remote point for receiving the signal radiations of said beacon, means for separating the carrier envelope wave into said fundamental frequency and said harmonic frequency, means for detecting said reference signals, a first phase comparator for comparing the phase of said fundamental frequency with the timing of said reference signals for coarse indication and a second phase comparator for comparing the phase of said harmonic frequency with the timing of said reference signals for fine indication.

2. A system according to claim 1, wherein said means for modulating said carrier frequency includes sources of two different sub-carrier frequencies, means for modulating one of said sub-carrier frequencies with reference signals with respect to said one lobe, means for modulating the other of said sub-carrier frequencies with reference signals with respect to other of said lobes and means for modulating said R-F carrier frequency with said modulated sub-carrier frequencies, and the means for detecting said reference signals includes means to separate and demodulate said sub-carrier frequencies.

3. A direction finding system comprising a beacon including an antenna system, a radiator and a plurality of spaced reflectors disposed about said radiator, means to produce effective rotation of said spaced reflectors about said radiator, said reflectors being spaced to produce a multilobe radiation pattern so that received radiations at a remote point with respect to said antenna system will have a fundamental frequency and a harmonic frequency dependent upon said rotation speed, a plurality of sub-carrier frequency sources, means synchronized to the rotation of one of said reflectors through a given radial direction for modulating one of said sub-carriers with pulses of a repetition frequency corresponding to said fundamental frequency and means synchronized to the rotation of other of said reflectors through said given radial direction for modulating a second of said sub-carriers with pulses of a repetition frequency corresponding to said harmonic frequency, a source of R-F energy, means to modulate said R-F energy with both modulated sub-carriers, means for applying said modulated R-F energy to said radiator; and means for indicating the direction from a receiving point to said beacon by means of energy received from said beacon comprising a receiver, means to separate the bearing envelope wave of the R-F carrier and said pulses, filtering means for separating the fundamental and harmonic frequency components from said bearing envelope wave, means to separate said pulses in accordance with the sub-carrier frequencies, means to compare the phase of the fundamental frequency component of said bearing envelope wave with the pulses corresponding to said fundamental frequency, and means to compare the phase of the harmonic frequency component of the said bearing envelope wave with the pulses corresponding to said harmonic frequency.

4. In a direction indicating device for indicating the direction line from a receiving point to a beacon from energy received from said beacon, which energy contains a bearing envelope wave of a signal determined by the position of the receiver with respect to the beacon composed of fundamental and harmonic frequency components and sub-carrier energy modulated by pulsed reference signals; means to separate said bearing envelope wave and said pulsed reference signals, filtering means for separating the fundamental and harmonic frequency components from said bearing envelope wave, means to separate said pulsed reference signals from said envelope wave, a first means to compare the phase of the fundamental frequency component with respect to the timing of certain of said pulsed reference signals and a second means to compare the phase of the harmonic frequency component with respect to the timing of certain of other of said pulsed reference signals.

5. In a direction finding device according to claim 4, further including means coupling said first and second phase comparing means at the ratio of said fundamental and harmonic frequencies.

6. A direction indicating device for determining direction to a source of carrier signals which signals contain a bearing envelope wave determined by the position of the receiver with respect to said source composed of fundamental and harmonic frequency components and modulations of pulsed reference signals, comprising means for receiving said carrier signals, means for separating the carrier envelope wave into said fundamental frequency and said harmonic frequency, means for detecting said pulsed reference signals, a first phase comparator for comparing the phase of said fundamental frequency with the timing of said pulsed reference signals for coarse indication and a second phase comparator for comparing the phase of said harmonic frequency with the timing of said pulsed reference signals for fine indication.

7. A direction indicating device according to claim 6, further including means for coupling said first and second comparator means on the basis of the ratio of said fundamental and harmonic frequencies, whereby any ambiguity in the comparison of said second comparing means is resolved by said first comparing means.

References Cited in the file of this patent

UNITED STATES PATENTS

| 2,536,509 | Luck | Jan. 2, 1951 |
| 2,564,703 | Litchford | Aug. 21, 1951 |
| 2,565,506 | Litchford | Aug. 28, 1951 |
| 2,572,041 | Litchford | Oct. 23, 1951 |